US009618701B2

(12) United States Patent
Mooij et al.

(10) Patent No.: US 9,618,701 B2
(45) Date of Patent: Apr. 11, 2017

(54) ELECTRICAL CONNECTOR ENCLOSURE ASSEMBLY

(71) Applicant: TE Connectivity Nederland BV, s'Hertogenbosch (NL)

(72) Inventors: Albert Pieter Jan Mooij, Hedel (NL); Ronald Nico Adriaan Daamen, Vught (NL); Freddy Jean Philip Dendas, Genk (NL); Tekke Drijfhout, Nistelrode (NL)

(73) Assignee: TE Connectivity Nederland BV, S Hertogenbosch (NL)

( * ) Notice: Subject to any disclaimer, the term of this patent is extended or adjusted under 35 U.S.C. 154(b) by 0 days.

(21) Appl. No.: 14/802,383

(22) Filed: Jul. 17, 2015

(65) Prior Publication Data
US 2016/0018603 A1    Jan. 21, 2016

(30) Foreign Application Priority Data

Jul. 18, 2014 (EP) .................................. 14177612

(51) Int. Cl.
| | | |
|---|---|---|
| *G02B 6/38* | (2006.01) | |
| *H01R 13/62* | (2006.01) | |
| *H01R 13/502* | (2006.01) | |
| *H01R 13/58* | (2006.01) | |
| *H01R 13/625* | (2006.01) | |

(52) U.S. Cl.
CPC ......... *G02B 6/3817* (2013.01); *G02B 6/3821* (2013.01); *G02B 6/3891* (2013.01); *H01R 13/502* (2013.01); *H01R 13/5825* (2013.01); *H01R 13/625* (2013.01)

(58) Field of Classification Search
CPC . G02F 1/133608; G02F 1/13452; B60C 3/04; B60C 11/0304; B60C 11/0306; B60C 11/033; B60C 11/0388; B60C 11/0348; B60C 2011/0372; G02B 6/3817; G02B 6/3821; G02B 6/3891
USPC ...................................... 385/76–88
See application file for complete search history.

(56) References Cited

U.S. PATENT DOCUMENTS

| | | | | |
|---|---|---|---|---|
| 4,365,214 A | * | 12/1982 | Shillady | H01P 5/02 333/245 |
| 4,396,917 A | * | 8/1983 | Tucker | G01S 7/38 342/15 |
| 4,440,464 A | * | 4/1984 | Spinner | H01R 27/00 439/218 |
| 5,722,846 A | | 3/1998 | Lazaro, Jr. | |

(Continued)

FOREIGN PATENT DOCUMENTS

EP    1589619 A1    10/2005

OTHER PUBLICATIONS

European Search Report, Application No. 14 17 7612, dated Dec. 17, 2014, 7 pages.

*Primary Examiner* — Akm Enayet Ullah
(74) *Attorney, Agent, or Firm* — Barley Snyder

(57) ABSTRACT

An enclosure assembly for a terminating transmission line and electrical connector has a housing sub-assembly and a telescoping sub-assembly. The telescoping sub-assembly has a retained state where the telescoping sub-assembly is longitudinally fixed within the housing sub-assembly, and a retaining section with a minimum retaining position, and a maximum retaining position distanced from the minimum retaining position along a longitudinal direction of the enclosure assembly.

19 Claims, 11 Drawing Sheets

(56) References Cited

U.S. PATENT DOCUMENTS

| | | | |
|---|---|---|---|
| 6,210,230 B1 * | 4/2001 | Lai ...................... | H01R 9/0518 439/101 |
| 6,567,436 B1 * | 5/2003 | Yao ...................... | H01S 5/0683 372/32 |
| 2004/0119551 A1 * | 6/2004 | Wray ...................... | H01P 1/268 333/22 R |
| 2004/0177989 A1 | 9/2004 | Nass et al. | |
| 2012/0190234 A1 | 7/2012 | Montena et al. | |

* cited by examiner

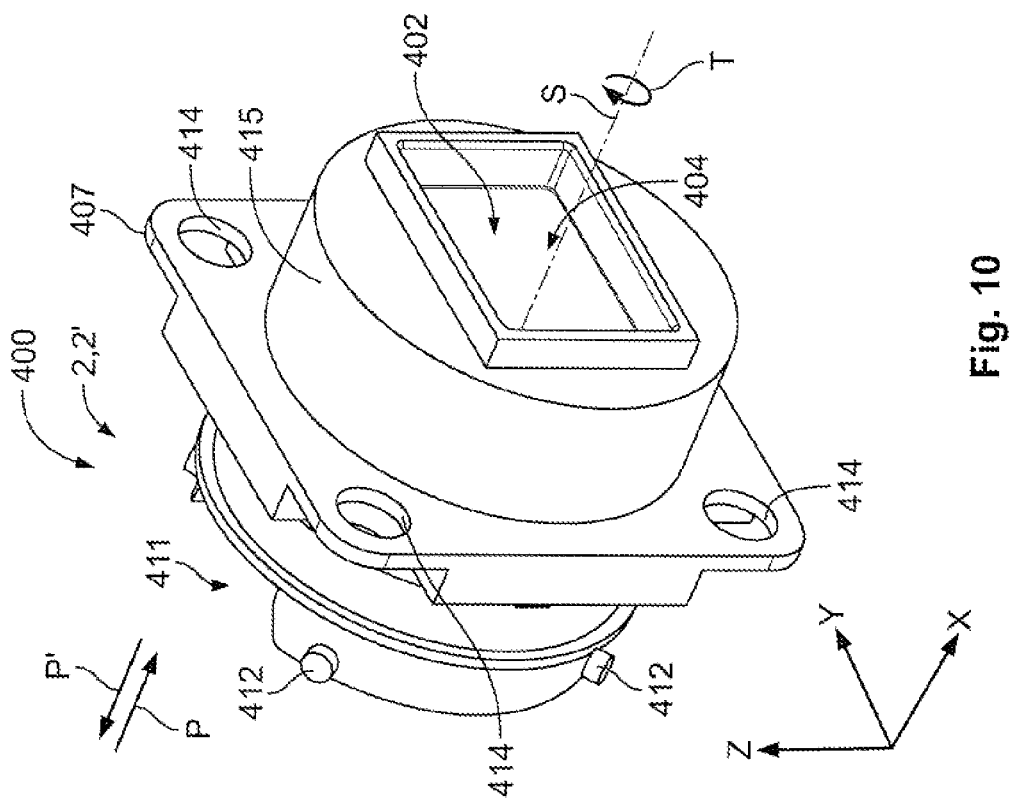
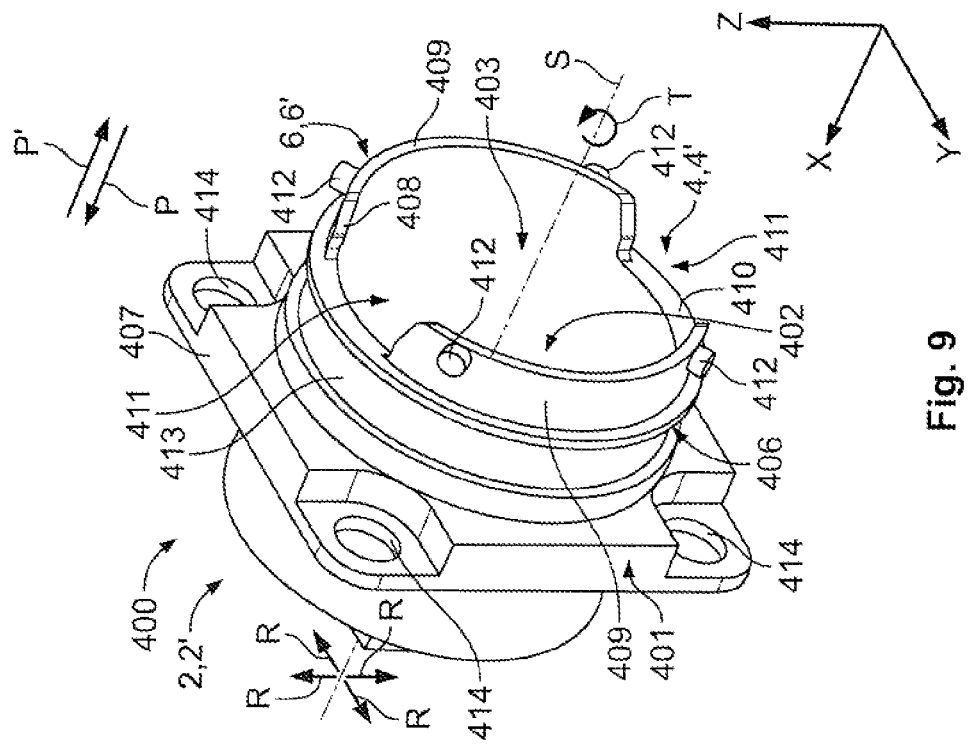
Fig. 10
Fig. 9

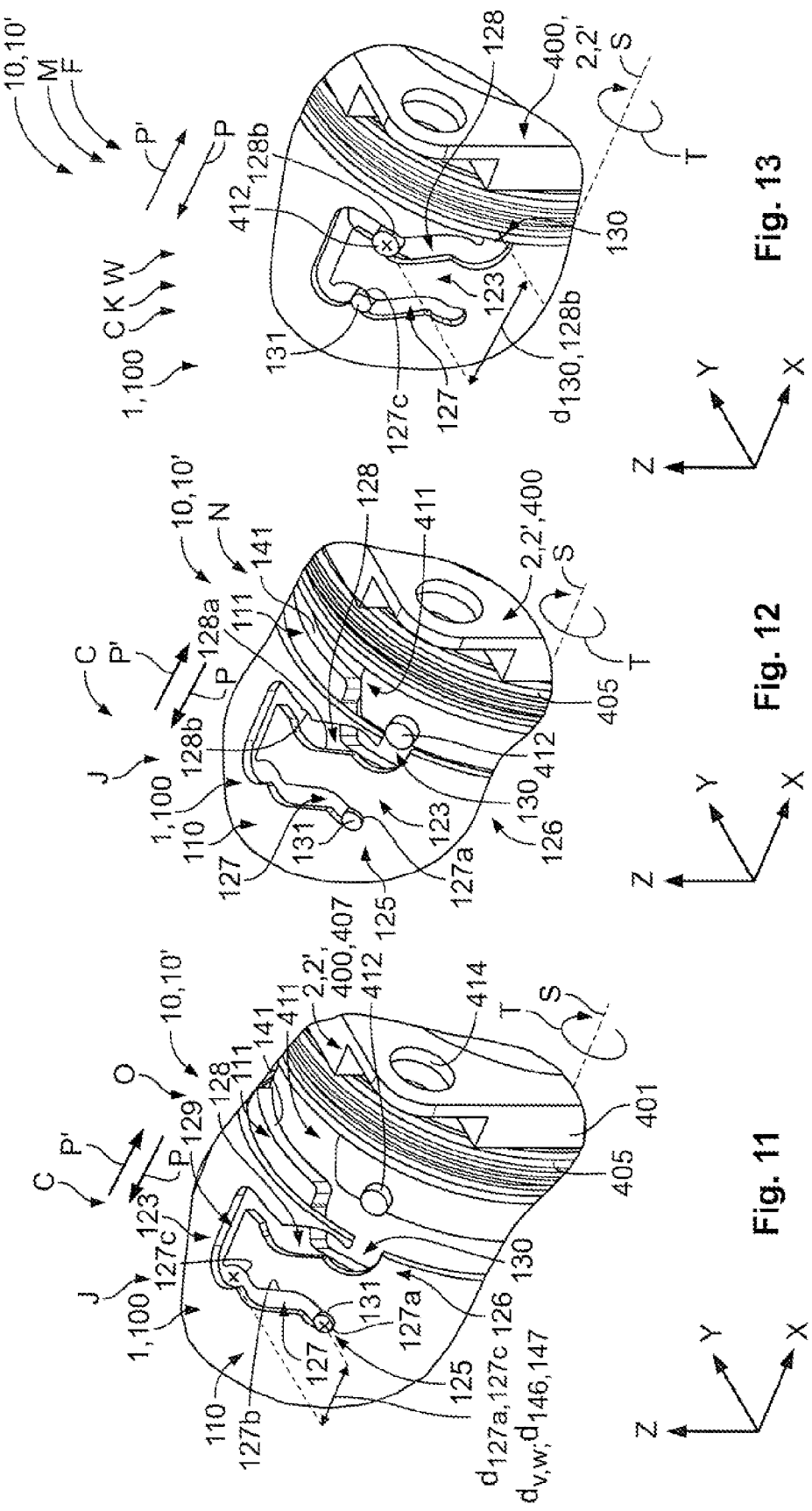

ELECTRICAL CONNECTOR ENCLOSURE ASSEMBLY

CROSS-REFERENCE TO RELATED APPLICATION

This application claim the benefit of the filing date under 35 U.S.C. §119(a)-(d) or (f) of European Patent Application No. 14177612.0 filed Jul. 18, 2014.

FIELD OF THE INVENTION

The invention is generally related to an electrical connector enclosure assembly, and, more specifically, to an electrical connector enclosure assembly for a terminating transmission line and electrical connector.

BACKGROUND

Enclosure assemblies are commonly used to house standardized connectors in order to protect them against harmful environmental impacts, such as shock, strain, corrosive substances, chemical and/or solar exposure. Generally, one or more cables are attached to the connectors, and have one or more transmission lines. The cable can be terminated by a terminating assembly or sub-assembly, which often includes a retainer or end cap positioned at a terminating end of the cable, where the transmission line exits the cable. The retainer may be used to attach the connector and/or the transmission line within the enclosure assembly.

Often, the cable is an optical fiber cable, where the transmission line is an optical fiber. Optical fibers can come as units having a fiber element composed of several individual fibers. These fibers can further be bundled into bundles comprising several fibers. Such a bundle or several bundles are then positioned within a cable. As the fibers themselves are rather long and thin, and therefore prone to damage by snapping and cracking, strain relief on the terminating end that joins with the connector is often advantageous in order to eliminate any stresses which could act on the fibers themselves.

The enclosure assembly, together with the connector received therein, is regarded as an electrical and/or optical plug connector adapted to be mated with a respective mating plug connector. The mating plug connector has a complimentary mating enclosure assembly and/or a mating connector. The enclosure assembly is adapted to be mated with the mating enclosure assembly, while at the same time, plugging the connector into the mating connector or vice versa. The mating connector may be part of a housing for electronic/electrical equipment and form a bulkhead at or in this housing. The dimensions of the mating plug connector, especially of the position of the mating connector within or with respect to the mating enclosure assembly along a longitudinal direction of the enclosure assembly and/or mating direction of the plug connector, may vary from manufacturer to manufacturer and/or application to application.

SUMMARY

An enclosure assembly for a terminating transmission line and electrical connector has a housing sub-assembly and a telescoping sub-assembly. The telescoping sub-assembly has a retained state where the telescoping sub-assembly is longitudinally fixed within the housing sub-assembly, and a retaining section with a minimum retaining position, and a maximum retaining position distanced from the minimum retaining position along a longitudinal direction of the enclosure assembly.

BRIEF DESCRIPTION OF THE DRAWINGS

The invention will be described by way of example, with reference to the accompanying Figures, of which:

FIG. 9 is a perspective view of a first end of a mating enclosure assembly;

FIG. 10 is a perspective view of a second end of the mating enclosure assembly shown in FIG. 9;

FIG. 11 is an enlarged perspective view of the enclosure assembly shown in FIGS. 1 to 8 in a fully assembled and pre-locked position with the mating enclosure assembly shown in FIGS. 9 and 10 in a pre-mated position;

FIG. 12 is an enlarged perspective view of the enclosure assembly shown in FIGS. 1 to 8 in the fully assembled and pre-locked position with a mating enclosure assembly shown in FIGS. 9 and 10 in a half-mated position;

FIG. 13 is an enlarged perspective view of a locking mechanism of the enclosure assembly shown in FIGS. 1 to 8 and the mating enclosure assembly shown in FIGS. 9 and 10 in the fully assembled state as well as in a locked position and fully mated position.

DETAILED DESCRIPTION OF THE EMBODIMENT(S)

Figure 1:
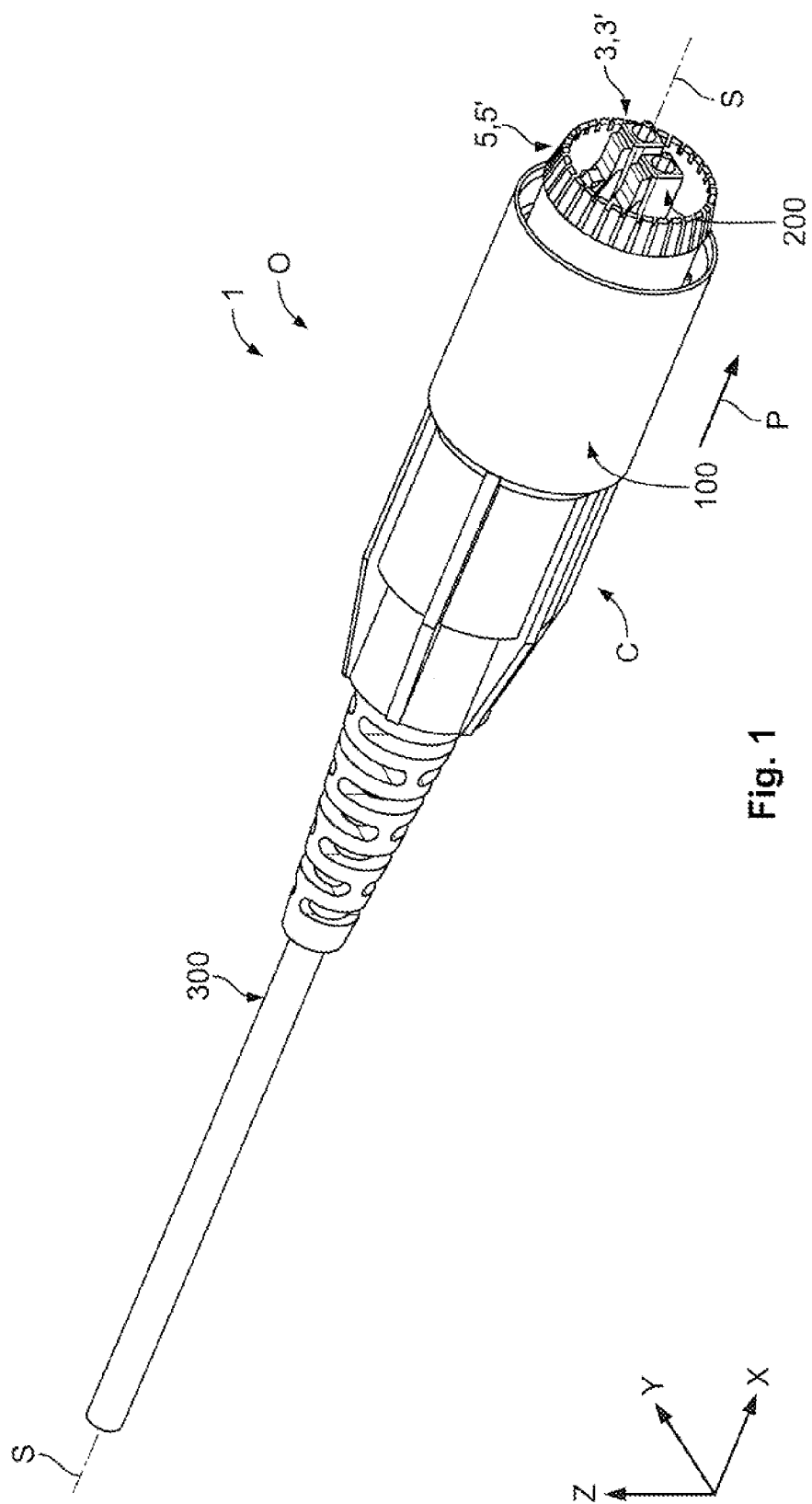
FIG. 1 is a perspective view of a plug connector.

The invention will be described hereinafter in detail with reference to embodiments. The embodiments are meant to be exemplary, and a one of ordinary skill in the art would appreciate that modifications can be made within the scope of the invention. Thus, the following description is a broad teaching for those of ordinary skill in the art and the content thereof is not intended to limit the invention to the embodiments set forth herein.

In the following detailed description, for purposes of explanation, numerous specific details are set forth in order to provide a thorough understanding of the disclosed embodiments. Those of ordinary skill in the art would appreciate that one or more embodiments may be practiced without these specific details. In other instances, well-known structures and devices are schematically shown in order to simplify the Figures. Corresponding elements illustrated in the drawings are provided with the same reference signs. Parts of the description relating to the same elements in different drawings are omitted.

In an embodiment of FIG. 1, an enclosure assembly 100 is shown in a fully assembled state C. The enclosure assembly 100 surrounds a terminating assembly 200 positioned on a terminating end of a cable 300. The cable 300 can be for data and/or electrical power transmission. A longitudinal axis S of the plug connector 1, the enclosure assembly 100, the terminating assembly 200 and the cable 300 runs centrally therethrough along a longitudinal direction X. The longitudinal direction X runs perpendicularly to a transverse direction Y. The longitudinal direction X and the transverse direction Y both run perpendicularly to a height or vertical direction Z. Together, the longitudinal direction X, the transverse direction Y and the height direction Z constitute a Cartesian coordinate system referring to the plug connector 1 and its components, i.e. the enclosure assembly 100, the terminating assembly 200 and the cable 300. In a mating direction P extending in parallel to the longitudinal direction X and hence also to the longitudinal axis S, the plug connector 1 may be mated with a complimentary mating plug connector 2 (See FIGS. 7 to 13).

The plug connector 1 has a plug face 3, 3' which is complimentary to a mating plug face 4, 4' of the mating connector 2, 2'. The mating connector 2, 2' can also include a cage with a transceiver. The plug face 3, 3' is defined by surfaces of the enclosure assembly 100 and the terminating assembly 200 facing in the mating direction P. The plug face 3, 3' is a plug portion 5, 5' which may be formed as a plug. The mating plug face 4, 4' is a part of a mating plug portion 6, 6' which is formed as a receptacle (see FIGS. 7 to 13). Those of ordinary skill in the art would appreciate that in other embodiments, the provision of a plug and a receptacle could also be vice versa.

Figure 2:
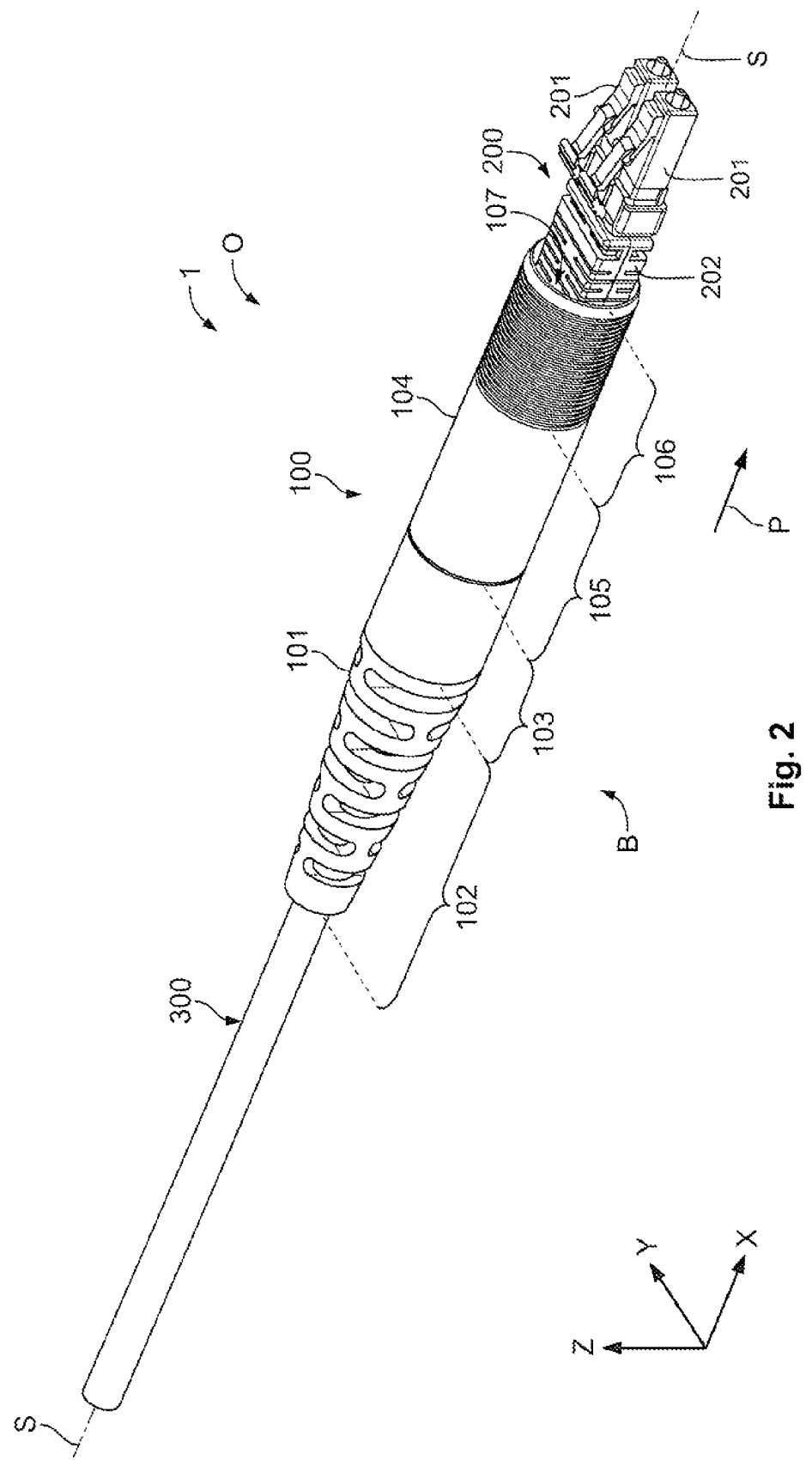
FIG. 2 is a perspective view of a terminating assembly having a retainer bushing.

In an embodiment of FIG. 2, the plug connector 1 is shown with elements of the enclosure assembly 100 having been removed, so that the connector 1, and in particular, the enclosure assembly 100 are shown in a pre-assembled state B. The enclosure assembly 100 has a strain relief 101 which, when assembling the plug connector 1, is positioned around an outer circumference of the cable 300. The strain relief 101 has a flexible section 102 with an outer diameter that tapers against the longitudinal direction X towards the bare cable 300, allowing the strain relief 101 to flexibly move together with the cable 300 held therein. The strain relief 101 further includes a holding section 103 that continuously extends in the mating direction P from a terminating end of the flexible section 102. The holding section 103 has a substantially cylindrical shape.

The enclosure assembly 100 has a retainer bushing 104 extending from a terminating end of the holding section 103, to a sealing section 105 of the enclosure assembly 100. The retainer bushing 104 has substantially the same outer diameter as the holding section 103 of the strain relief 101. Adjacent to the sealing section 105 along the longitudinal direction X, the retainer bushing 104 has a threaded retaining section 106 for retaining the retainer bushing 104 so that movements thereof along the longitudinal direction X with respect to the terminating assembly 200 and/or the cable 300 are inhibited. The retainer bushing 104 at least partially defines an assembly receiving space 107 of the enclosure assembly 100 for receiving at least sections of the terminating assembly 200. The terminating assembly 200 includes one or more connectors. In an embodiment, the connectors are LC-type connectors for establishing an optical data transmission link. In an embodiment shown in FIG. 2, the terminating assembly 200 has two connectors 201, which are both held by a guiding support 202. The guiding support 202 permits a limited degree of flexibility, primarily in the vertical direction Z and in the transverse direction Y perpendicularly to the mating direction P, thus compensating for off-set and tolerances at the mating connector side of the connection.

Figure 3:
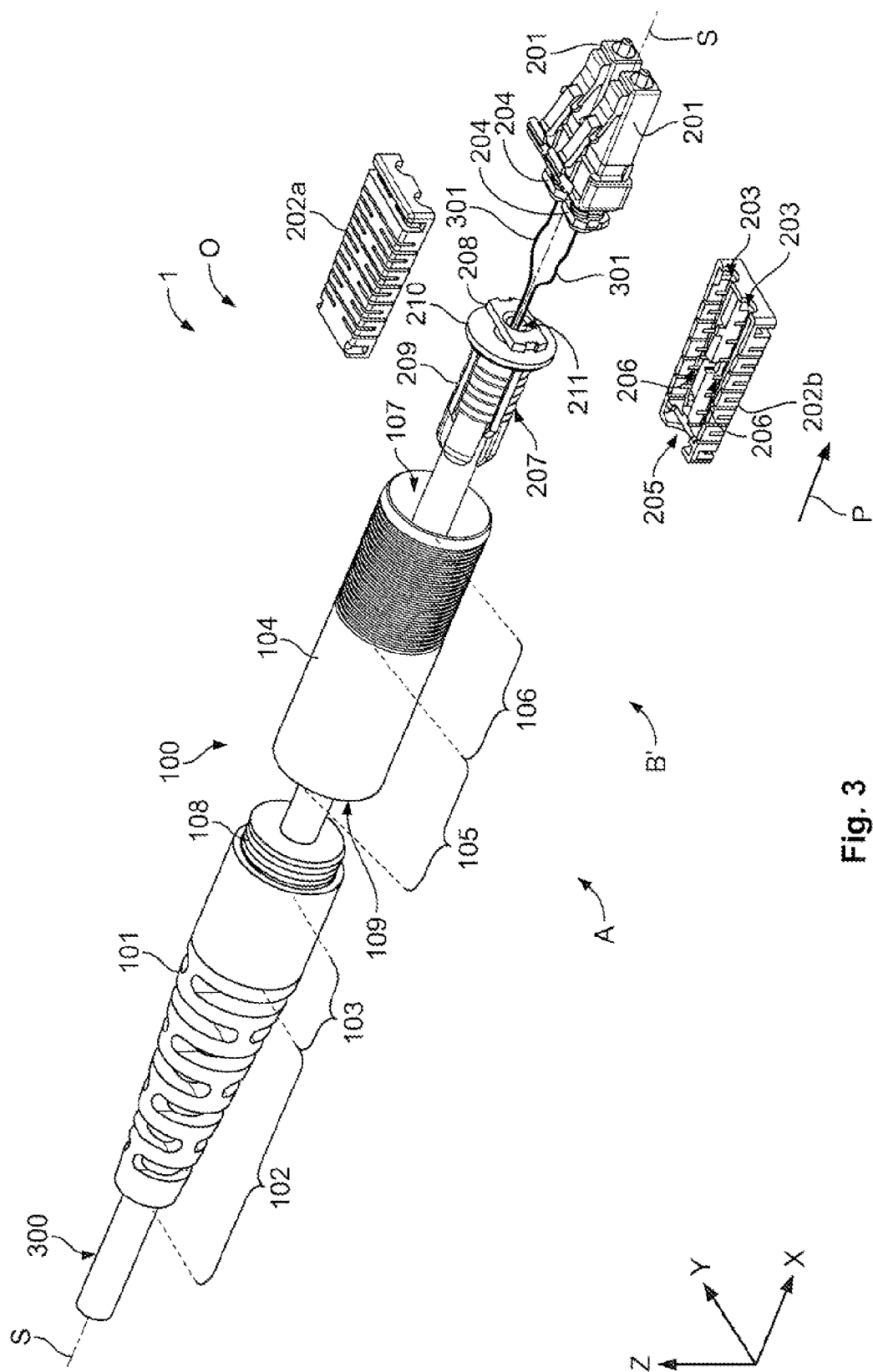
FIG. 3 is an exploded view of the terminating assembly.

The embodiment of FIG. 3 shows the plug connector 1 in an unassembled state A. The guiding support 202 has an upper shell 202a and a lower shell 202b, together providing a seating 203 for each of the connectors 201, in particular for a mounting section 204 thereof or an adapter piece connected thereto. The guiding support 202 has a cable retainer receiving space 205. Adjacent to a cable retainer receiving space 205, channels 206 for transmission lines 301 of the cable are formed. The cable retainer receiving space 205 serves for receiving a retainer 207 of the terminating assembly, particularly a cable retainer 208. The retainer 207 is positioned on the terminating end of the cable 300 and encompasses the cable 300 with a clamping section 209. The retainer 207 further includes a supporting flange 210 in the form of a collar for supporting the retainer 207 within the retainer bushing 104. A transmission line receiving passageway 211 of the retainer 207 serves for guiding the e.g. two transmission lines 301 of the cable 300 towards the guiding support 202. The transmission lines 301 exit the retainer 207 from the transmission line receiving passageway 211, which is formed and arranged concentrically to the cable retainer 208, and are then loosely guided within the respective channel 206 of the guiding support 202 in order to then enter the terminals 201 at the respective mounting section 204. Thereby, the guiding support 202 provides strain relief for the transmission lines 301 between the retainer 207, in particular the cable retainer 208 thereof and the connectors 201, in particular each of the mounting sections 204 thereof.

In the unassembled state A shown in FIG. 3, the strain relief 201 is detached from the retainer bushing 104. Both the strain relief 101 and the retainer bushing 104 are positioned away from the terminating end of the cable 300 opposite to the longitudinal direction X, as compared to their respective positions shown in FIGS. 1 and 2. For firmly connecting the strain relief 101 to the retainer bushing 104, the mating end of the strain relief 101 has an outer threading 108 on an outer surface. The retainer bushing 104 has a corresponding internal threading 109 on an inner surface of the receiving end, so that the strain relief 101 and the retainer bushing 104 can be screwed together and immobilized with respect to each other in and opposite to the longitudinal direction X.

Figure 4:
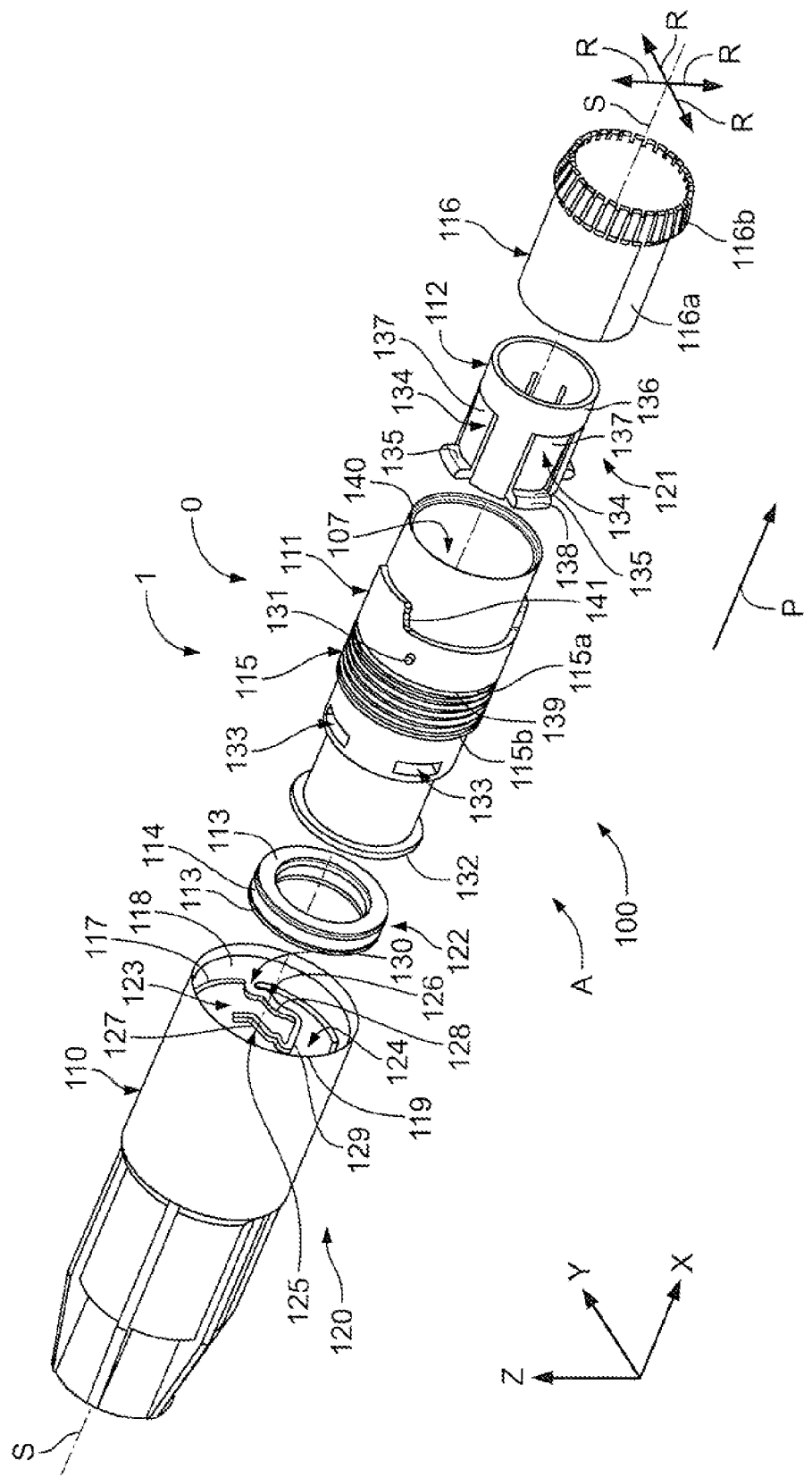
FIG. 4 is a perspective exploded view of an enclosure assembly.

In an embodiment shown in FIG. 4, the enclosure assembly 100 further includes an outer shell 110, an inner body 111, a spring retainer 112, two washers 113, a seal 114, a spring 115 and a shield 116. The outer shell has a step 117 extending along an inner circumference, as well as with a sealing collar 118 and a terminating end edge 119. The outer shell 110, the inner body 111 and the shield 116 constitute part of a housing sub-assembly 120 of the enclosure assembly 100. The retainer bushing 104 and the spring retainer 112 constitute parts of a telescoping sub-assembly 121 of the enclosure assembly 100. The washers 113 and the seal 114 constitute parts of a sealing sub-assembly 122 of the enclosure assembly 100.

The outer shell 110 includes a locking mechanism 123 and a receiving space 124 for receiving at least sections of the telescoping sub-assembly 121 and the sealing sub-assembly 122. The locking mechanism 123 has a first bayonet coupling 125 and a second bayonet coupling 126 in the form of a first slot 127 and a second slot 128, respectively, which are connected to each other by a transitional slot 129. The transitional slot 129 extends substantially in parallel to the longitudinal direction X. The second slot 128 opens in the longitudinal direction X at an insertion opening 130 in order to be able to receive a first pin 138 formed at the inner body 111 and a second pin of a mating enclosure assembly (see FIGS. 9-13).

The assembly receiving space 107 extends into at least a portion of the inner body 111. On a side facing towards the sealing sub-assembly 122, the inner body 111 has a flange adapted and arranged to support the sealing sub-assembly 122, in particular one of the washers 113 thereof, at the inner body 111. Counter latching elements 133 are disposed in the wall of the inner body 111 as cut-outs for receiving retaining elements 134 of the spring retainer 112, in particular latching elements 135 thereof. The retaining elements 134 are locking hooks extending away from a collar section of the spring retainer 112 in a direction opposite to the longitudinal direction X and in parallel to the longitudinal axis S, and each having a spring section 137. From each of the spring sections 137, one of the latching elements 135 extends away in a radial direction R, extending radially around and perpendicularly away from the longitudinal axis S. Each of the retaining elements 134 has an actuator 138, e.g. as shown herein in the form of a rounded-off tip of each of the latching elements 135 facing into the radial direction R and the longitudinal direction X.

Figure 14:
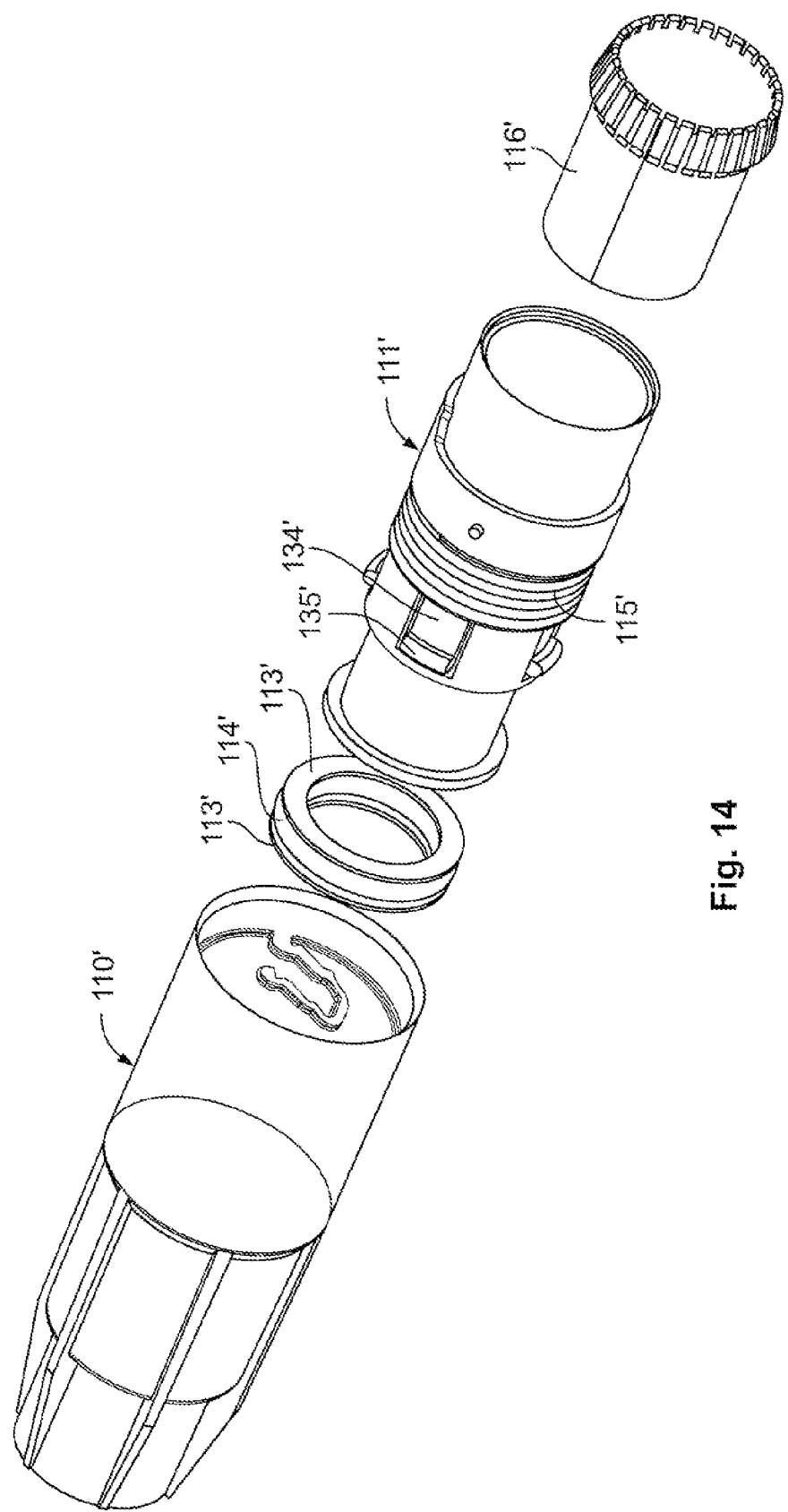
FIG. 14 is an exploded view of an enclosure assembly.

Similarly to FIG. 4, the embodiment of FIG. 14 shows an embodiment of an enclosure assembly 100' having an outer shell 110', an inner body 111', two washers 113', a seal 114', a spring 115' and a shield 116'. The inner body 111' has the features of the separate inner body 111 and the spring retainer 112 (see FIG. 4) integrated in one element. Latching and retaining elements 135', 134' are positioned in or at the inner body 111'. The spring 115 is arranged on an outer circumference of the inner spring body 111'.

As shown in FIG. 4, the spring 115 encompasses the outer circumference of the inner body 111 and is supported at a terminating end 115a at a support 139 formed at the inner body 111 as a rim providing an edge facing against the longitudinal direction X. A receiving end 115b of the spring 115 faces opposite to the longitudinal direction X and opposite the mating end, towards the outer shell 110. The shield 116 has a sleeve 116a adapted to be inserted into the inner body 111 and a cuff 116b comprising multiple contact springs arranged annularly around the sleeve 116a so that the shield 116 may be seated on a terminating end rim 140 of the inner body 111, closely fitted on the terminating end rim. In order to closely engaging the enclosure assembly 100 with a mating enclosure assembly (see FIGS. 7 to 13) with a positive-fit, the inner body 111 has a mating contour 141 facing in the mating direction P and shaped complementary to a counter mating contour of the mating enclosure assembly (see FIGS. 9 and 10).

Figure 5:
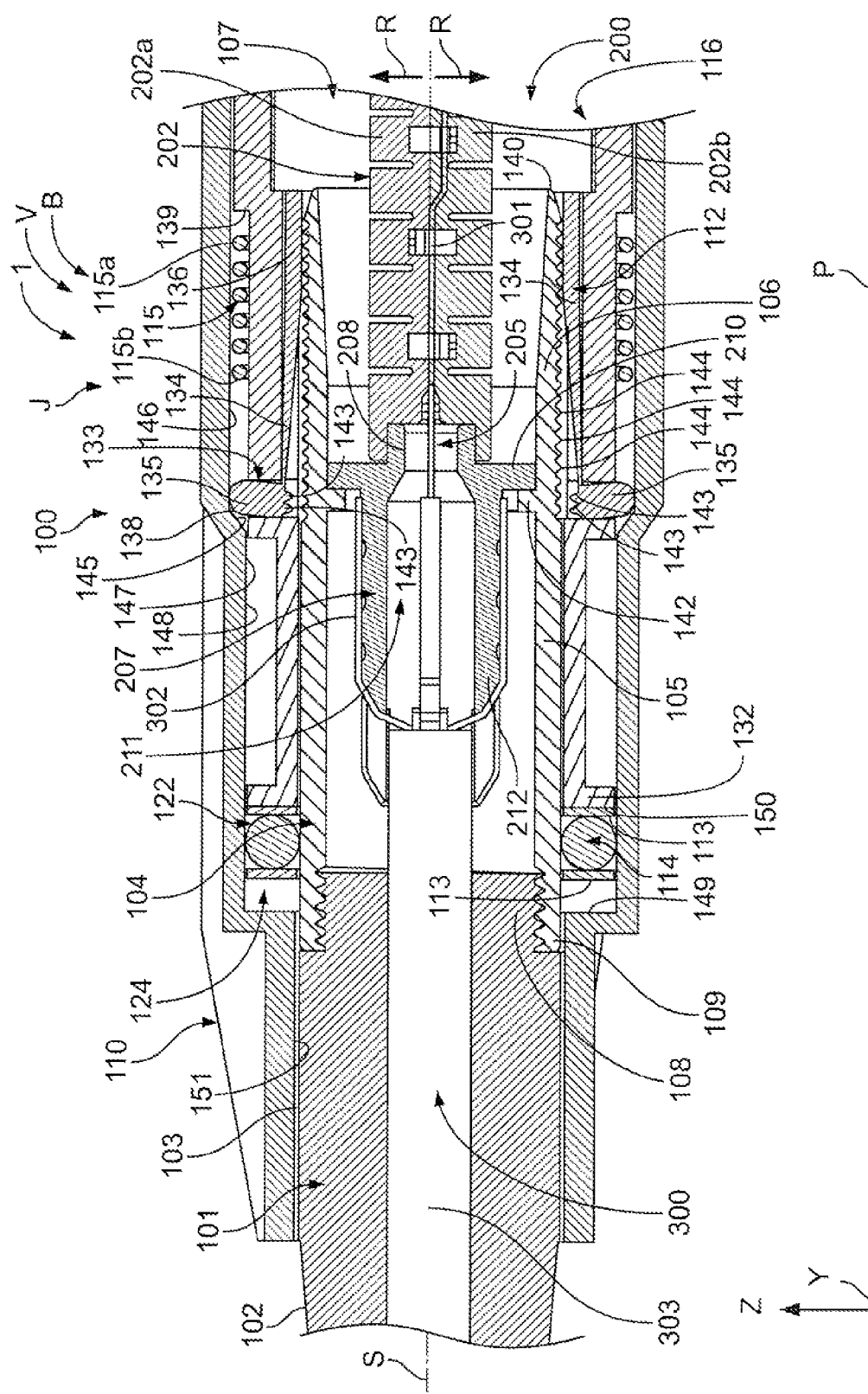
FIG. 5 is a cross-sectional view of a detail of the enclosure assembly and the terminating assembly in a pre-assembled state.

In an embodiment of FIG. 5, the plug connector 1 is shown with the enclosure assembly 100 in the pre-assembled state B and in a pre-locked position V. The telescoping sub-assembly 121 includes the retainer bushing 104, the spring retainer 112 and the strain relief 101 and is received in the assembly receiving space 107 provided by the housing sub-assembly 120. The housing sub-assembly 120 includes the outer shell 110 and the inner body 111. The inner body 111 and the sealing sub-assembly 122 are received within the receiving space 124 provided by the outer shell 110. The terminating assembly 200 is received within the assembly receiving space 107.

The cable 300 is connected to the terminating assembly 200 such that a strength member 302 of the cable surrounding the transmission lines 301 is disposed between the transmission lines 301 and a sheath 303 of the cable, and is fixed to the retainer 207. Thereby, the cable 300 is held in a loose fit to the retainer 207. The retainer 207 has slots 212 to receive the strength members 302 and to pass them to an outside of the retainer 207. The strength members 302 are fixed to the retainer 207 by a fastener, such as a glue or potting. The glue or potting surrounds the space around the retainer 207 and is used for fixing the cable 300 at least via the strength members 302 to the retainer 207 and also seals the boot 101 to the cable.

The cable 303 is guided by the strain relief 101, especially in the region of the outside threading 108, with the strain relief 101 being screwed into the inner threading 109 of the retainer bushing 104 in the pre-assembled state B. In an embodiment, the strain relief 101 can be a "slide fit" boot; which is generally no water tight and not an over-molded. The cable retainer 208 of the retainer 207 is held within the cable retainer receiving space 205 of the guiding support 202. Hence, strain relief 101 for the transmission line 301 is provided between the point where it exits the sheath 303 of the cable 300 until it enters and is terminated within the connector 201 by the positive fit and/or frictional connection between the cable 300, in particular, the strength member 302, and sheath 303, the retainer 207, the guiding support 202 and the connector 201. The retainer 207 is supported within the retainer bushing 104 in that the supporting flange 210 abuts a counter support element 142 in the form of annular rim extending along the inner circumference of the retainer bushing 104, thus providing a narrowing within which the retainer 207 is seated.

The threaded retaining section 106 of the retainer bushing 104 is inserted into the spring retainer 112. An end of the collar section 136 of the spring retainer 112 facing in the longitudinal direction X and the terminating end rim 140 of the retainer bushing 104 are aligned to each other in the height direction Z, being positioned at approximately the same level in the longitudinal direction X. Retaining teeth or ribs 143 formed at each of the retaining elements 134 being positioned a distance from complimentary retaining ribs 144 positioned at the outer circumference of the retaining section 106. The complimentary retaining ribs 144 have the shape of ribs and/or teeth or a thread equally distanced from each other in parallel to the longitudinal direction X. The retaining ribs 143 are positioned at a side of the latching elements 135 opposing the actuators 138 in the height direction Z, opposite to the radial direction R. Hence, by pressing on the actuators 138 opposite to the radial direction R, the retaining elements 134 are urged towards to the retaining section 106. Thereby, the retaining ribs 143 are brought into engagement with the complimentary retaining ribs 144, so that both overlap in a projection along the longitudinal direction X in order to inhibit movements of the retainer bushing 104 with respect to the spring retainer 112. The spring retainer 112 is secured against movements with respect to the inner body 104 in that the latching elements 135 are received within the counter latching elements 133. Hence, the spring retainer 112 is supported in and opposite to the longitudinal direction X at the inner body 104.

By moving the actuators 138 of the latching elements 134 opposite to the longitudinal direction X along the inner circumference of the outer shell 110, the actuators 138 contact a bevel 145 extending along the inner circumference of the outer shell 110. The bevel 145 separates a release section 146 of the outer shell 110 from an actuating section 147 of the outer shell 110. The release section 146 has a smaller inner diameter than the actuating section 147. Hence, the inner circumference of the inner body 110 tapers at the bevel 145 in a direction opposite to the longitudinal direction X. When abutting the release section 146, the retaining ribs 143 are held at a distance in the radial direction R from the complimentary retaining ribs 144 and, hence, the enclosure assembly 100 is in an unretained state J.

For transferring the enclosure assembly 100 from the unretained state J into a retained state K, the latching elements 134, in particular the actuators 138 thereof, are removed from the release section 146 along the bevel 145, onto the actuating section 147 opposite to the longitudinal direction X. For achieving this movement, a spring force of the spring 115 is overcome, since the spring 115 has a terminating end 115*a* that is connected at the support 139 of the retainer bushing 104 on the one side and on a counter support (not shown) formed at the inner circumference of the outer shell 110 of an opposite side, thereby generating expanding spring forces between the outer shell 110 and the inner body 111. Thus the inner body 111 can be urged away or out of the outer shell 110 in the longitudinal direction X. These spring forces help in safely actuating the first bayonet coupling 125 constituted by the first slot 127 guiding the first pin 138.

As shown in an embodiment of FIG. 5, the sealing section 105 of the retainer bushing 104 is aligned with a counter sealing section 148 of the inner circumference of the outer shell 110, between the actuating section 147 and a stop 149, where the inner circumference of the outer shell 110 further narrows with respect to the sealing section 148. The sealing assembly 122 is positioned between the stop 149 and a pressing surface 150 provided by the flange 132 formed at the end of the inner body 111 facing opposite to the longitudinal direction X. The stop 149 is positioned between the counter sealing section 148 and a guiding section 151 of the outer shell 110. The holding section 103 of the strain relief 101 and the sealing section 105 is at least partially received in the guiding section 151 and encompassed by a clearance between the holding section 103, as well as the sealing section 105 on the one side and the guiding section 151 on the other side in the radial direction R. Thus, a certain play between them allows the telescoping sub-assembly 121 to be easily, yet precisely replaced with respect to the housing sub-assembly 120 in and opposite to the longitudinal direction X.

Figure 6:
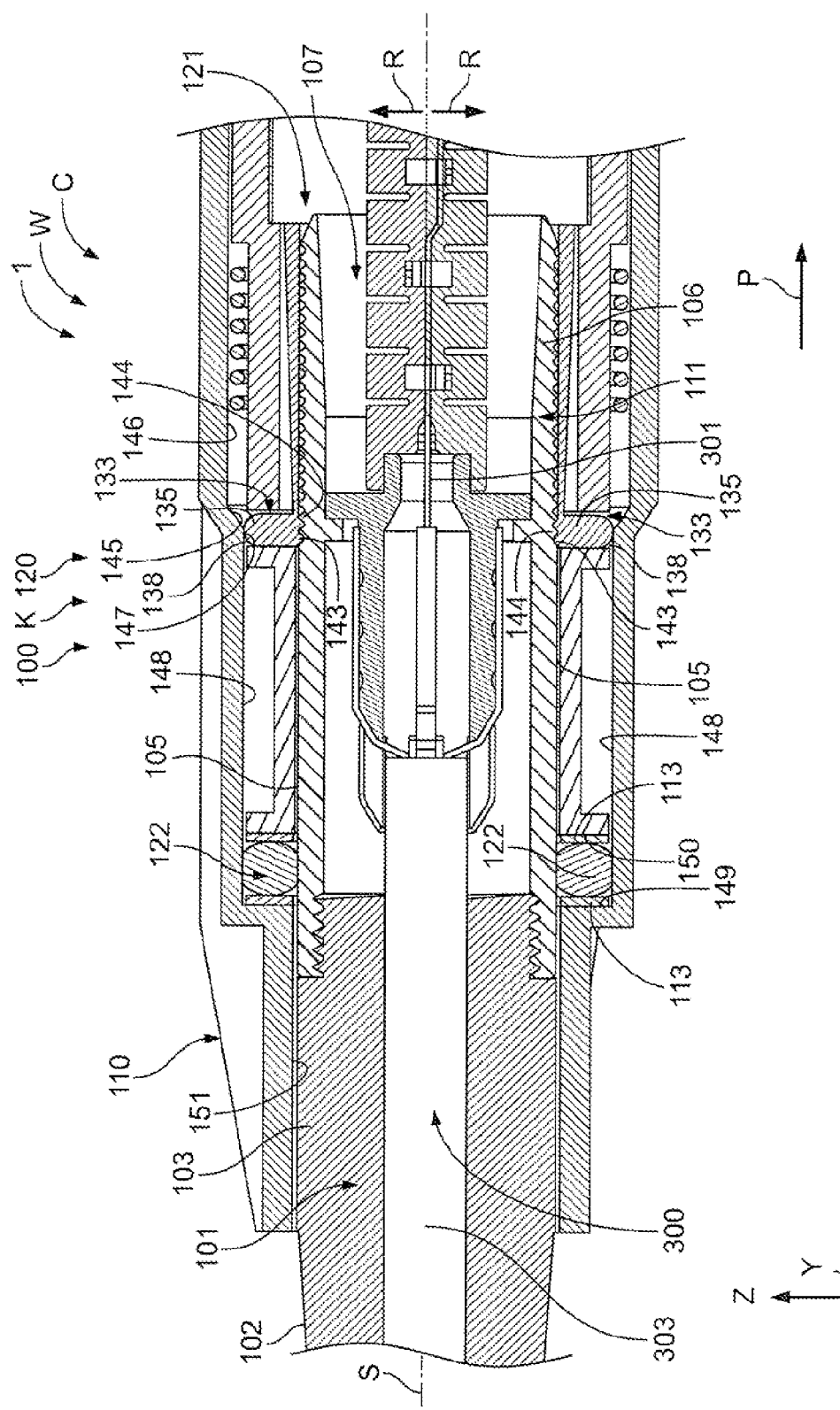
FIG. 6 is a cross-sectional view of the enclosure assembly and the terminating assembly shown in FIG. 5 in an assembled state.

In an embodiment shown in FIG. 6, the plug connector 1 is in the fully assembled state C, where the enclosure assembly 100 is in a locked position W, and in the retained state K. In comparison to the pre-assembled state B, pre-locked position V and unretained position J, shown in FIG. 5, in the fully assembled state C, locked position W and retained state K, the telescoping sub-assembly 121 is moved with respect to the housing sub-assembly 120 opposite to the longitudinal direction X. Thereby, the latching element 135 within the counter latching element 133 are moved with their actuators 138 from the release section 146, over the bevel 145, onto the actuating section 147, which presses onto the actuators 138 and thus urges the retaining ribs 143 towards the complimentary retaining ribs 144. Thereby, the retaining ribs 143 are meshed with the complimentary retaining ribs 144, so that they overlap with each other in the longitudinal direction X and prevent movements of the telescoping sub-assembly 121, with respect to the housing sub-assembly 120, in parallel to the longitudinal direction X.

Additionally, the pressing surface 150 is simultaneously moved when transferring the enclosure assembly 100 from the unretained position J into the retained position K, so that the pressing surface 150 urges the sealing sub-assembly 122 against the stop 149. Thereby, the seal 122 is compressed in parallel to the longitudinal direction X and thus expanded in the radial direction R. The elastic deformation of the seal 122 seals between the housing sub-assembly 120 and the telescoping sub-assembly 121, in particular between the sealing section 105 and the counter sealing section 148 provided at the inner body 111, and the outer shell 110, respectively. Thus, the sealing sub assembly 122 seals between the inner circumference of the outer shell 110 and the outer circumference of the inner body 105 in the vicinity of the guiding section 151, where the strain relief 101 enters the assembly receiving space 107 of the enclosure assembly 100. The assembly receiving space 107 is sealed towards a mating end 152 of the enclosure assembly 100 (see FIGS. 7 and 8).

Figure 7:
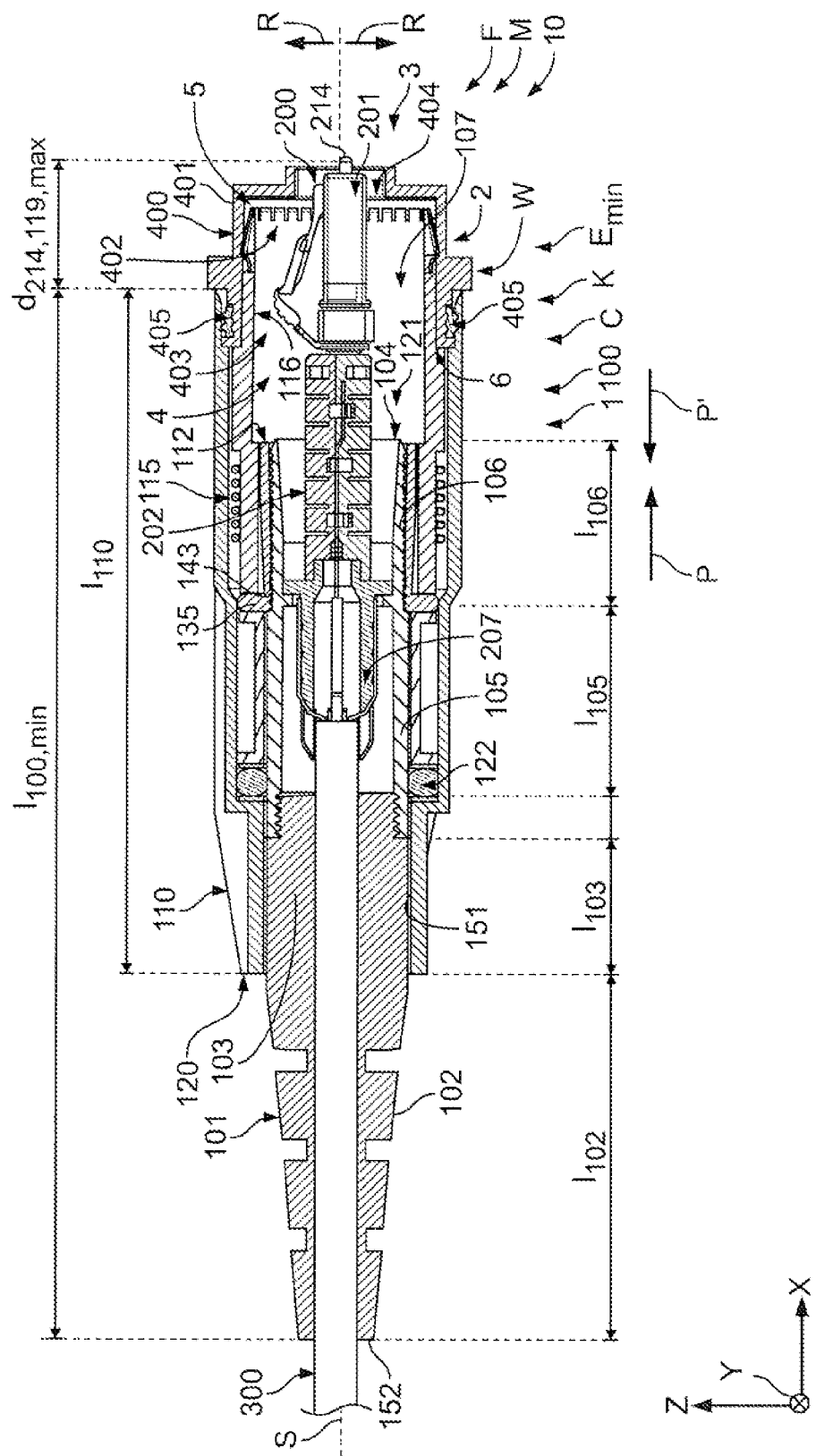
FIG. 7 is a cross-sectional view of the enclosure assembly in the assembled state in a minimally expanded retaining position.

In an embodiment shown in FIG. 7, the connector assembly 10 is in a final state F with the plug connector 1 and the mating plug connector 2 in a fully mated position M, the enclosure assembly 100 is in a fully assembled state C, in the retained state K and a first retaining position Emin. In the first retaining position Emin, a distance d214,119,max between a tip 214 of the connector 201 and the terminating end edge 119 of the outer shell, and therefore the enclosure assembly 100, is maximal in the sense that the tip 214 is just above the terminating end edge 119 in the longitudinal direction X. In other words, the connector 201 is slightly moved out of the assembly receiving space 107 of the enclosure assembly 100 in the longitudinal direction X.

In the first retaining position Emin, the enclosure assembly 100 has a minimal length l100, min, measured in parallel to the longitudinal direction X. The minimal length l100,min of the enclosure assembly 100 is substantially the sum of a length l110 of the outer shell 110 and a length l100 of the flexible section 102 of the strain relief 101, both measured in parallel to the longitudinal direction X. The holding section 103 is received with its entire length l103 within the guiding section 151. The sealing assembly 122 is arranged at a mating end position of the sealing section 105 at a length l105 measured in parallel to the longitudinal direction X. The retaining ribs 143 are arranged at a rear end of the retaining section 106 having a length l106 measured in parallel to the longitudinal direction X. An entire minimal connecting length l1,min of the plug connector 1 is thus regarded as the sum of the length l100,min of the enclosure assembly 100 and the distance d214,119,max between the tip 214 and the terminating end edge 119.

In the embodiment shown in FIG. 7, the mating plug connector 2 includes a mating enclosure assembly 400 with a mating housing 401 having a receiving space accessible through a mating plug opening 403 in the mating direction P. The mating plug opening 403 is opening in a mating direction P' running opposite to the mating direction P. The mating plug connector 2 can be mated with the plug connector 1 by moving the mating plug connector 2 towards the plug connector 1 in the mating plug direction P'. In the fully mated stated M, the plug face 3 is in complementary engagement with the mating plug face 4. The plug portion 5 is plugged into the mating plug portion 6. The connector 201 is positioned, in the longitudinal direction X, in a mating rear opening 404 formed at the mating end of the mating housing 401 facing away from the plug connector 1 in the longitudinal direction X.

To seal the plug connector 1 and the mating plug connector 2, a mating seal 405 is provided which circumferentially encompass the mating plug portion 6 on the outside. In an embodiment, the mating seal 405 is an annular seal abutting the enclosure assembly 100 along the inner circumference of the outer shell 110, especially in the region of the sealing collar 118. Thereby, the assembly receiving space 107 I sealed at the terminating end by the mating seal 405 and at the mating end by the sealing arrangement 122.

There is a third area that is sealed; the boot 101 and retainer bushing 104 versus the cable. This is achieved by potting/gluing the space around the retainer 207. The step 117 and/or the terminating end edge 119 abuts the mating enclosure assembly 400 in the longitudinal direction X. The mating plug portion 6 is arranged between the sealing collar 118 and the terminating end rim 140 along the radial direction R, so that the mating plug portion 6 is closely fitting embedded between the outer shell 110 and the inner body 111 providing at least parts of the plug portion 5. A mechanically stable positive-fit and/or friction-fit connection between the plug element 1 and the mating plug element 2 is thus provided.

Figure 8:
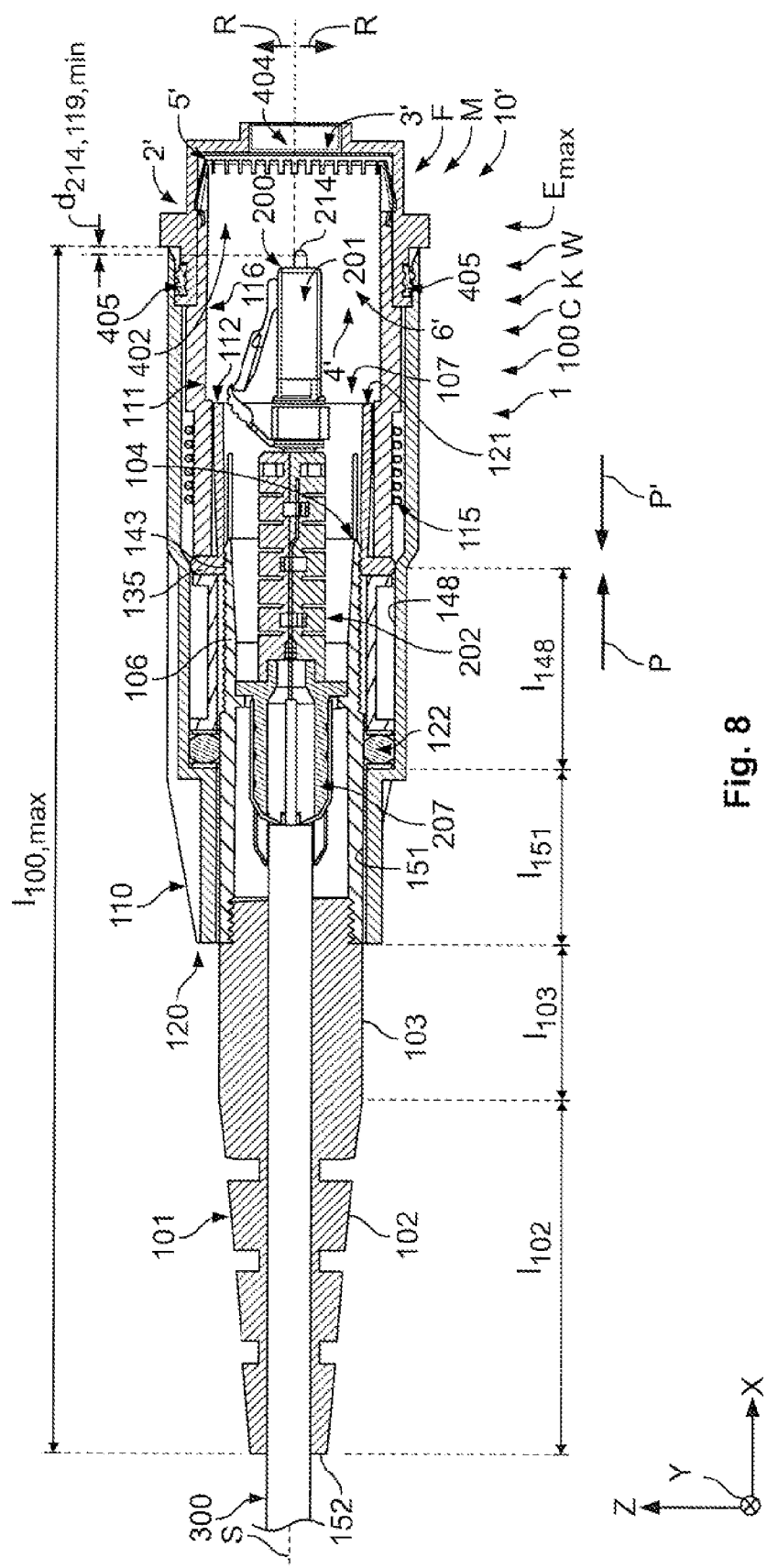
FIG. 8 is a cross-sectional view of the enclosure assembly and the terminating assembly in the fully assembled position in a maximally expanded retaining position.

In an embodiment of FIG. 8, a connector assembly 10' in a final state F with the plug connector 1 and a mating plug connector 2' in the fully mated position M is shown, wherein the enclosure assembly 100 is in the fully assembled state C, in the retained state K, and in a second retaining position Emax, being maximally expanded. In comparison to the first retaining position Emin as shown in FIG. 7, to an embodiment shown FIG. 8, the enclosure assembly 100 has a maximal length l100, max exceeding the minimum length l100, min. The tip 214 of the connector 201 is arranged under a minimal distance d214,119,min with respect to the terminating end edge 119, measured in parallel to the longitudinal direction X. The minimal distance d214,119, min may be a negative distance, meaning that the tip 214 is drawn behind the terminating end edge 119 into the assembly receiving space 107 opposite to the longitudinal direction X. Thereby, the connector 1 provides the further embodiment of the plug face 3' and the further embodiment of the plug portion 5' and is hence adapted to the further embodiment of the mating plug face 4' and the mating plug portion 6', respectively. The connector 201 is held at a distance from the mating rear opening 404 in the longitudinal direction X.

As shown in the embodiment of FIG. 8, in the second retaining position Emax, the holding section 103 is almost completely withdrawn from the guiding section 151 opposite to the longitudinal direction X. The retaining ribs 143 are arranged at a terminating end of the retaining section 106, which is almost entirely withdrawn into the counter sealing section 148 opposite to the longitudinal direction X. A length l148 of the counter sealing section 148 is substantially equal to the length l105 of the sealing section 105, both measured in parallel to the longitudinal direction X. A length l151 of the guiding section 151 is substantially equal to a length l106 of the retaining section 106, both measured in parallel to the longitudinal direction X.

In an embodiment of FIG. 9, the mating enclosure assembly 400 is suitable for different embodiments of mating plug connectors 2, 2'. The mating enclosure assembly 400 includes the mating housing 401 having the receiving space 402 accessible through the plug opening 403 in the mating direction P and further mating rear opening 404 in the mating plug direction P'. The mating enclosure assembly 400, together with a desired and/or required embodiment of a mating plug connector (not shown), provides the respective embodiments of the mating plug face 4, 4' and mating plug portion 6, 6'.

The mating plug opening 403 has an substantially cylindrical mating sleeve 406 which extends from a plate-like mounting base 407 of the mating housing 401 in the mating plug direction P'. A mating contour 408 is formed at the mating sleeve 406 complementarily to the contour 401 of the enclosure assembly 100 of the plug element 1. The mating contour 408 has lugs 409 protruding from a terminating end face of the mating sleeve 406 in the mating plug direction P', being formed between each other two cut-outs 411. Hence, the mating contour 408 establishes a positive fit with the contour 141, so that movements of the enclosure assembly 100, in particular of the body 111 in a turning direction T circumferentially encircling the longitudinal direction S in a mathematic positive turning movement within a plane extending substantially in parallel to the transverse direction Y and the height direction Z, is inhibited.

Mating pins or second pins 412 are provided at the mating plug portion 6, 6'. For example, four second pins 412 may be circumferentially distributed under equal distance to each other to the longitudinal axis S along the outer circumference of the mating plug portion 6, 6'. The second pins 412 may protrude from the mating plug portion 5, 5' in the radial direction R. For example, the second pins 412 may be arranged at the lugs 409. Two second pins 412 may be formed at each of the lugs 409. The second pins 412 are adapted and arranged to form at least a part of the second bayonet coupling 126. They may be formed so as to be closely fitting guided within the second slot 128 in order to connect the enclosure assembly 100 to the mating enclosure assembly 400. The mating enclosure assembly 400 can also be used with only one cut-out 411 and two second pins 412 instead of two cut-outs and four pins respectively.

In order to retain the mating seal 405 at the mating enclosure assembly 400, the mating enclosure assembly 400 has a seating 413 in the form of a groove circumferentially extending around the mating plug portion 6, 6', in particular the mating sleeve 406. For mounting the mating enclosure assembly 400, the base has mounting elements 414 in the form of eyelets or through-holes for mounting the enclosure assembly 400 to an enclosure, housing or other parts of the electrical equipment. Generally the enclosure assembly 400 is mounted by fasteners such as screws or other elements, enabling a positive-fit and/or friction fit.

In an embodiment of FIG. 10, the receiving space 402 is accessible through the substantially rectangular mating rear opening 404, which extends approximately in a plane extending in parallel to the transverse direction Y and the height direction Z. Thereby, a cage with a transceiver (not shown) may be placed within the mating rear opening 404 in a positive-fit manner so that movements of the mating connector with respect to the mating enclosure assembly 400 in or against the turning direction T can be inhibited. Further, the mating rear opening 404 is formed at a mating end side of an extension 415 of the enclosure assembly 400, in particular of the mating housing 401. The extension 415 can be used to let the mating enclosure assembly 400 reach through a wall portion of electronic equipment (not shown).

In an embodiment of FIG. 11, a connector assembly 10, 10' is shown with the enclosure assembly 100 in a pre-locked position V in the unretained state J and with the mating enclosure assembly 400 in an unmated position O, where they are brought into engagement with each other by movements with respect to each other in the mating direction P and unplug direction P', respectively. The first pin 131 is introduced through the insertion opening 130 into the locking mechanism 123, moved along the second slot 128, along the transitional slot 129, into the first slot 127, and finally rests within a pre-locking end 127a of the first slot 127 after having passed a guidance 127b and a retaining structure 127c of the first slot 127. A distance d127a,127c between the pre-locking end 127a and the retaining structure 127c, measured approximately in parallel to the longitudinal direction X, is substantially equal to a distance d146,147 between the release section 146 and the actuating section 147, measured substantially in parallel to the longitudinal direction X. Both distances d127a,127c and d146,147 equal approximately a distance dVW between the pre-locked position V and the locked position W. Hence, by turning the inner body 111 with respect to the outer shell 110 in the turning direction T, the first pin 131 is moved out of the pre-locking end 127a along the guidance 127b into the retaining structure 127c, and the enclosure assembly 100 is transferred from the pre-locked position V into the locked position W, and hence from the unretained state J into the retained state K.

In an embodiment shown in FIG. 12, the locking mechanism 123 with the connector assembly 10, 10' is in a pre-mated position N, where the enclosure assembly 100 is in the pre-locked position V and the unretained state J, while being partly brought into engagement with the mating enclosure assembly 400. In the pre-mated position N, the contour 141 and the mating contour 411 are at least partly brought into engagement with each other. The second pin 412 is placed within the insertion opening 130. For mating the connector assembly 10, 10' with the mating enclosure assembly 100, the internal cable assembly (shown in FIG. 2) is mated first, after that the housing sub-assembly 120, including the outer shell assembly with the outer shell 110 as (shown in FIG. 4), is mated. The mating is done sequentially. Then, in the pre-mated position N, the retaining position Emin, Emax is adjusted while the connector 201 stays in correct engagement with the mating connector (not shown). In other words, the pre-mated position N with the enclosure assembly 100 in the release state K and the pre-locked position V may be a situation where the enclosure assembly 100 is in the fully assembled state C and, by moving the telescoping sub-assembly 121 with respect to the housing sub-assembly 120, the position of the terminating assembly 200, especially of the tip 214 of the connector 201 with respect to the outer shell 110, may be adjusted by performing telescoping movements to provide the desired and/or required dimensions of the connector assembly 10, 10' in parallel to the longitudinal direction X, while the connector 201 is received within the enclosure assembly 100 and/or after being mated with the mating connector.

In an embodiment shown in FIG. 13, the locking mechanism 123 of the connector assembly 10, 10' is in the final state F. In the final state F, the enclosure assembly 100 and the mating enclosure assembly 400, and hence the plug connector 1 and the mating plug connector 2, 2' are in a fully mated position M. The enclosure assembly 100 is in the fully assembled state C, in the retained state K and locked position W. The pin 131 rests in the retaining structure 127c. The second pin 412 rests in a mating structure 128b of the second slot 128. The second pin 412 has moved out of its position in the insertion opening 130 (shown in FIG. 12) along a mating guidance 128a of the second slot 128. Thereby, the second pin 412 has travelled a distance d130, 128b between the insertion opening 130 and the mating structure 128b in parallel to the longitudinal direction X, which approximately equals the distance d127a,127c between the pre-locking end 127a and the retaining structure 127c. The guidance 127b and the mating guidance 128a may have approximately the same length, thereby enabling the first pin 131 and the second pin 412 to simultaneously travel substantially along the same distance when transferring the enclosure assembly 100, from the pre-locking position V into the locked position W, and at the same time bringing the connector assembly 10, 10' from the pre-mated position N into the fully mated position M.

Deviations from the above-described embodiments of a connector assembly 10, 10' having the plug connector 1, mating plug connector 2, 2' and enclosure assembly 100, 100', mating enclosure assembly 400, respectively, are possible without departing from the inventive idea. The plug connector 1 may be designed as a plug-element or plug with a plug face 3, 3' and a plug portion 5, 5', which may be adapted to respective mating connectors 2, 2', which be provided as mating plug-elements or receptacles having mating plug faces 4, 4' and mating plug portions 6, 6', as desired for a certain application.

The enclosure assembly 100, 100' may have strain reliefs 101, flexible sections 102, holding sections 103, retainer bushing 104, sealing sections 105, retaining sections 106, assembly receiving spaces 107, outside threadings 108, inner threadings 109, outer shells 110, inner bodies 111, spring retainers 112, washers 113, seals 114 and shields 116, steps 117, sealing collars 118, terminating end edges 119 in whatever number and form desired in order to provide a housing sub-assembly 120, a telescoping sub-assembly 121 and sealing sub-assembly 122 and/or a locking mechanism 123. These elements may be formed and shaped as desired and provided with receiving spaces 124, first bayonet couplings 125, second bayonet couplings 126, first slots 127 with pre-locking ends 127a, guidances 127b, retaining structures 127c, second slots 128 with mating guidances 128a, mating structures 128b as well as flanges 132, counter latching elements 133, retaining elements 134, latching elements 135, collar sections 136, spring sections 137, actuators 138, supports, 139, terminating end rims 140, contours 141, counter support elements 142, retaining organs 143, complimentary retaining ribs 144, bevels 145, release sections 146, actuating sections 147, counter sealing sections 148, counter sealing sections, stops 149, pressing surfaces 150, guiding sections 151 and/or rear sides 152 in whatever number and form required for a certain application.

The terminating assembly 200 may comprise connectors 201, guiding supports 202 with upper shells 202a, lower shells 202b, seatings 203, mounting sections 204, cable retainer receiving spaces 205, channels 206, retainers 207, cable retainers 208, supporting flanges 210, transmission line receiving passageways 211, slot 212, and/or tips 214 in whatever number and form required for terminating a cable 300. The cable 300 may comprise transmission lines 301, strength members 302 and/or sheaths 303 in whatever number and form required for a desired application.

A mating enclosure assembly 400 may comprise mating housings 401, receiving spaces 402, mating plug openings 403, mating rear openings 404, mating seals 405, mating sleeves 406, mounting bases 407, mating contours 408, lugs 409, terminating end faces 410, cut-outs 411, mating pins 412, seatings 413, mounting elements 414 and/or extensions 415 in whatever number and form required for a desired application.

What is claimed is:

1. An enclosure assembly for a terminating transmission line and electrical connector, comprising:
   a housing sub-assembly; and
   a telescoping sub-assembly having:
      a retaining section with:
         a minimum retaining position, and
         a maximum retaining position distanced from the minimum retaining position along a longitudinal direction of the enclosure assembly, and a retained state where the telescoping sub-assembly is longitudinally fixed within the housing sub-assembly.

2. The enclosure assembly according to claim 1, wherein the retaining section has multiple retaining positions distanced from each other along the longitudinal direction.

3. The enclosure assembly according to claim 1, wherein the minimum retaining position is spaced from the maximum retaining position along the longitudinal direction at an approximately equal increment.

4. The enclosure assembly according to claim 1, wherein the minimum and maximum retaining positions are defined by at least two ribs partially extending circumferentially along an outer surface of the telescoping sub-assembly.

5. The enclosure assembly according to claim 1, wherein the housing sub-assembly further comprises a shield.

6. The enclosure assembly according to claim 1, wherein the telescoping sub-assembly further comprises a retainer bushing positioned adjacent to the retaining section.

7. The enclosure assembly according to claim 6, wherein the telescoping sub-assembly further includes a spring retainer having a retaining element engaged with the retaining section in a fully assembled state, whereby a positional relationship of the spring retainer to the retainer bushing is substantially fixed along the longitudinal direction.

8. The enclosure assembly according to claim 7, wherein the spring retainer is supported by the housing sub-assembly in the fully assembled position in or against the longitudinal direction.

9. The enclosure assembly according to claim 7, wherein the spring retainer has an actuator, and the housing assembly has a complimentary actuator engaging section.

10. The enclosure assembly according to claim 9, wherein the spring retainer is in a retained state when the actuator is engaged with the actuator engaging section.

11. The enclosure assembly according to claim 10, wherein when the enclosure assembly is in the fully assembled position, the spring retainer is in the retained state.

12. The enclosure assembly according to claim 1, wherein the housing sub-assembly further includes:
an inner body,
an outer shell into which the inner body is partially inserted in a fully assembled state, and
a locking mechanism connecting the inner body to the outer shell when in the fully assembled state.

13. The enclosure assembly according to claim 12, wherein the locking mechanism has one or more first bayonet couplings positioned on the inner body and the outer shell.

14. The enclosure assembly according to claim 13, wherein when the inner body is connected to the outer shell in the fully assembled state, and a position of the inner body with respect to the outer shell is longitudinally fixed.

15. The enclosure assembly according to claim 14, wherein the first bayonet coupling includes:
one or more first pin receiving slots positioned on the outer shell, and
one or more corresponding first pins positioned on the inner body.

16. The enclosure assembly according to claim 14, wherein the locking mechanism further includes a second bayonet coupling having one or more second pin receiving slots disposed on the outer shell and connecting the enclosure assembly to a mating enclosure assembly.

17. The enclosure assembly according to claim 16, wherein the first pin receiving slot is connected to the second pin receiving slot by a transitional slot.

18. The enclosure assembly according to claim 16, wherein the second pin receiving slot opens to an outside of the enclosure assembly through an insertion opening.

19. The enclosure assembly according to claim 1, further comprising a sealing sub-assembly having:
an annular seal, and
a washer positioned between the seal and the housing sub-assembly and the telescoping sub-assembly, and being compressively biased against the seal in the longitudinal direction.

* * * * *